United States Patent
Datar et al.

(10) Patent No.: US 7,676,416 B2
(45) Date of Patent: *Mar. 9, 2010

(54) SYSTEMS, METHODS AND COMPUTER PROGRAM PRODUCTS FOR PERFORMING A CONTINGENT CLAIM VALUATION

(75) Inventors: Vinay T. Datar, Mercer Island, WA (US); Scott H. Mathews, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1977 days.

This patent is subject to a terminal disclaimer.

(21) Appl. No.: 10/309,659

(22) Filed: Dec. 4, 2002

(65) Prior Publication Data

US 2003/0078870 A1     Apr. 24, 2003

Related U.S. Application Data

(63) Continuation-in-part of application No. 09/902,021, filed on Jul. 10, 2001, now Pat. No. 6,862,579.

(51) Int. Cl.
    G06Q 40/00 (2006.01)
(52) U.S. Cl. .................................. 705/36 R; 705/35
(58) Field of Classification Search .......... 705/35–36 R
    See application file for complete search history.

(56) References Cited

U.S. PATENT DOCUMENTS

| | | |
|---|---|---|
| 5,377,095 A | 12/1994 | Maeda et al. |
| 5,692,233 A | 11/1997 | Garman |
| 5,710,578 A | 1/1998 | Beauregard et al. |
| 5,960,407 A | 9/1999 | Vivona |
| 6,061,662 A | 5/2000 | Makivic |

(Continued)

FOREIGN PATENT DOCUMENTS

EP     1 178 416 A1     2/2002

(Continued)

OTHER PUBLICATIONS

Eric L. Burgess, Hany S. Gobrieal; *Integrating Spacecraft Design and Cost-Risk Analysis Using NASA Technology Readiness Levels*; Feb. 1996; 29th Annual DoD Cost Analysis Symposium, Leesburg, Virginia; 14 pages; The Aerospace Corporation; Herndon, Virginia.

(Continued)

*Primary Examiner*—Narayanswamy Subramanian
(74) *Attorney, Agent, or Firm*—Alston & Bird LLP

(57) ABSTRACT

Systems, methods and computer program products for performing a valuation of a contingent claim, such as a call or a put, are provided that initially determine the present value distribution of contingent future benefits that is attributable to the exercise of a contingent claim, such as according to a jump-diffusion model. The present value of an exercise price, such as a distribution of contingent future investments of a distribution of contingent future investments, required to exercise the contingent claim is also determined. An average of the difference between the present value distribution of contingent future benefits and the present value of the contingent future investment is determined. By utilizing appropriate discount rates, the benefits and investment can be effectively valued, which, in turn, permits the contingent claim project to be effectively valued in an intuitive manner.

30 Claims, 9 Drawing Sheets

U.S. PATENT DOCUMENTS

| | | | |
|---|---|---|---|
| 6,078,893 | A | 6/2000 | Ouimet et al. |
| 6,078,901 | A | 6/2000 | Ching |
| 6,157,918 | A | 12/2000 | Shepherd |
| 6,205,431 | B1 | 3/2001 | Willemain et al. |
| 6,321,205 | B1 | 11/2001 | Eder |
| 6,321,212 | B1 | 11/2001 | Lange |
| 6,381,586 | B1 | 4/2002 | Glasserman et al. |
| 6,393,406 | B1 | 5/2002 | Eder |
| 6,578,016 | B1* | 6/2003 | Trankina et al. ............ 705/39 |
| 6,629,082 | B1 | 9/2003 | Hambrecht et al. |
| 6,810,332 | B2 | 10/2004 | Harrison |
| 6,853,952 | B2 | 2/2005 | Chadwick |
| 6,862,579 | B2* | 3/2005 | Mathews et al. .......... 705/36 R |
| 6,910,017 | B1 | 6/2005 | Woo et al. |
| 6,963,854 | B1 | 11/2005 | Boyd et al. |
| 7,085,734 | B2 | 8/2006 | Grant et al. |
| 7,110,956 | B1 | 9/2006 | Drake et al. |
| 7,133,848 | B2 | 11/2006 | Phillips et al. |
| 7,197,474 | B1 | 3/2007 | Kitts |
| 7,206,755 | B1* | 4/2007 | Muralidhar ................ 705/26 |
| 7,315,842 | B1 | 1/2008 | Wang |
| 7,349,878 | B1 | 3/2008 | Makivic |
| 7,363,267 | B1* | 4/2008 | Vincent et al. ............. 705/37 |
| 7,398,221 | B1 | 7/2008 | Bensoussan et al. |
| 7,574,394 | B2* | 8/2009 | Chorna et al. ............ 705/36 R |
| 2001/0034686 | A1* | 10/2001 | Eder ........................ 705/36 |
| 2001/0041996 | A1 | 11/2001 | Eder |
| 2002/0010667 | A1 | 1/2002 | Kant et al. |
| 2002/0065755 | A1* | 5/2002 | Shlafman et al. ............ 705/36 |
| 2002/0116348 | A1 | 8/2002 | Phillips et al. |
| 2002/0143604 | A1 | 10/2002 | Cox et al. |
| 2003/0014337 | A1 | 1/2003 | Mathews et al. |
| 2003/0033154 | A1* | 2/2003 | Hajdukiewicz et al. ........ 705/1 |
| 2003/0033191 | A1 | 2/2003 | Davies et al. |
| 2003/0078870 | A1 | 4/2003 | Datar et al. |
| 2003/0115128 | A1 | 6/2003 | Lange et al. |
| 2003/0144897 | A1 | 7/2003 | Burruss et al. |
| 2004/0068455 | A1 | 4/2004 | Jacobus et al. |
| 2004/0098327 | A1 | 5/2004 | Seaman |
| 2004/0128221 | A1 | 7/2004 | Pandher |
| 2004/0249642 | A1* | 12/2004 | Mathews et al. ............. 705/1 |
| 2005/0102213 | A1* | 5/2005 | Savasoglu et al. .......... 705/36 |
| 2005/0125318 | A1* | 6/2005 | Jameson .................. 705/30 |
| 2006/0253355 | A1* | 11/2006 | Shalen .................... 705/35 |
| 2007/0011065 | A1* | 1/2007 | Sreenivasan et al. ......... 705/35 |
| 2007/0022031 | A1 | 1/2007 | Sponholtz et al. |
| 2007/0050282 | A1 | 3/2007 | Chen et al. |
| 2007/0106576 | A1* | 5/2007 | Jung et al. ................ 705/35 |
| 2007/0112661 | A1* | 5/2007 | Mathews .................. 705/35 |
| 2007/0150390 | A1* | 6/2007 | Mathews et al. .......... 705/36 R |
| 2007/0150391 | A1* | 6/2007 | Mathews et al. .......... 705/36 R |
| 2007/0150392 | A1* | 6/2007 | Mathews et al. .......... 705/36 R |
| 2007/0150393 | A1* | 6/2007 | Mathews et al. .......... 705/36 R |
| 2007/0150394 | A1* | 6/2007 | Mathews et al. .......... 705/36 R |
| 2007/0150395 | A1* | 6/2007 | Nakamoto et al. ........ 705/36 R |
| 2007/0162376 | A1* | 7/2007 | Mathews et al. .......... 705/36 R |
| 2007/0299753 | A1* | 12/2007 | Averbuch et al. ............ 705/35 |
| 2008/0015871 | A1* | 1/2008 | Eder ........................ 705/1 |
| 2008/0109341 | A1* | 5/2008 | Stiff et al. ............... 705/36 R |
| 2008/0147568 | A1* | 6/2008 | Wang .................... 705/36 R |
| 2008/0167984 | A1* | 7/2008 | Courey et al. .............. 705/38 |
| 2008/0208678 | A1 | 8/2008 | Walser et al. |
| 2008/0228605 | A1* | 9/2008 | Wang .................... 705/30 |
| 2008/0288394 | A1* | 11/2008 | Eder ....................... 705/38 |
| 2009/0030822 | A1* | 1/2009 | Cresswell ................. 705/35 |
| 2009/0043604 | A1* | 2/2009 | Jung et al. ................. 705/1 |
| 2009/0043683 | A1* | 2/2009 | Jung et al. ................ 705/35 |
| 2009/0099955 | A1* | 4/2009 | Peters et al. ................ 705/37 |

FOREIGN PATENT DOCUMENTS

| | | |
|---|---|---|
| JP | 2001357189 A | 12/2001 |

OTHER PUBLICATIONS

Ray Nelson; Risk Analysis Using @RISK® and Crystal Ball® ; *Oracle of IIF*; Dec. 2000; pp. 8-11.

John M. Charnes; Using Simulation for Option Pricing; Dec. 2000; pp. 151-157; *Proceedings of the 2000 Winter Simulation Conference*, Orlando, Florida.

*Risk Analysis Overview—What is Risk?*; Available at <http://www.decisioneering.com/risk-analysis-print.html> (visited Feb. 19, 2002).

*Real Options with Monte Carlo Simulation*; Available at <http://www.puc-rio.br/marco.ind/monte-carlo.html> (visited Feb. 25, 2002).

*Cone of Uncertainty*; Available at <http://www.real-options.com/cou.html> (visited Oct. 11, 2002).

Weston Copeland; *Managerial Finance*; 1990; pp. 481-487, 406-407, 642 (10 pages); $9^{th}$ Edition, ISBN 0 03 0558832.

Alan Shapiro; *Modern Corporate Finance*; 1990; pp. 438, 261; ISBN 002409530-3.

Felstead, "A Mathematical Approach to Cost Minimization of Satcom Systems", 1996, IEEE, pp. 352-356.

Morrison, "Life Cycle Approach to New Product Forecasting", Summer 1995, *The Journal of Business Forecasting Methods & Systems*, 14, 2, ABI/INFORM Global, p. 3.

Eskin, "Dynamic Forecast of New Product Demand Using a Depth of Repeat Model", May 1973, *JMR Journal of Marketing Research*, 10, 0000002, AB/INFORM Global, p. 115.

Bassin, "The Logistic Curve—another approach to new product forecasting", Fall 1991, *The Journal of Business Forecasting Methods & Systems*, 10, 3, ABI/INFORM Global, p. 14.

Paszko et al., "Product Life Cycles and Profitability", Summer 1989, *The Journal of Business Forecasting Methods & Systems*, 8, 2; ABI/INFORM Global, p. 26.

Nelson, "The Product Life Cycle of Engineered Metals: a comparative analysis of the application of product life cycle theory", Spring 1992, *The Journal of Business & Industrial Marketing*, 7, 2, ABI/INFORM Global, p. 5.

Curry, "FALCCM-H: Functional Avionics Life Cycle Cost Model for Hardware", © 1993, IEEE, pp. 950-953.

Xie et al., "Probabilistic Design Optimization of Aircraft Structures with Reliability, Manufacturability, and Cost Constraints", Apr. 7-10, 2003, $44^{th}$ AIAA/ASME/ASCE/AHS Structures, Structural Dynamics, and Materials Conference, Norfolk, VA, p. 1.

Marx et al., "Knowledge-based manufacturing and structural design for a high speed civil transport", 1994, $1^{st}$ Industry / Academy Symposium on Research for Future Supersonic and Hypersonic Vehicles, Greensboro, NC pp. 1-6.

Schrage, "Technology for Rotorcraft Affordability Through Integrated Product/Process Development (IPPD)", 1999, American Helicopter Society $55^{th}$ Annual Forum, Montreal, Canada, pp. 1-19.

Kamath et al., T.P.M. (2002) A Bayesian approach to a dynamic inventory model under an unknown demand distribution. Computers & Operations Research, v. 29, pp. 403-422.

Hirschleifer (1980) Price Theory and Applications. Prentice-Hall: New York, pp. 126-151.

Morris (1992) Market Oriented Pricing. Quarom Books: New York, pp. 172-173.

Evans and Berman (1992). Marketing. Macmillan: New York. Chapter 18: Overview of Price Planning, pp. 526-547.

Berry et al., Automobile Prices in Market Equilibria. Econometrica, vol. 63, No. 4 (Jul. 1995), pp. 841-890.

Monroe, (1978) Models for Pricing Decisions, *Journal of Marketing Research*, vol. XV (August), pp. 413-428.

Urban et al., (1968) A New Product Analysis and Decision Model, *Management Science*, vol. 14, No. 8 (April), pp. B490-B519.

Yang et al. (2003) Bayesian Analysis of Simultaneous Demand and Supply, Quantitative Marketing and Economics, vol. 1, pp. 251-275.

Largent, "A probabilistic risk management based process for planning and management of technology development", PhD Dissertation Georgia Tech Aerospace Engineering, Mar. 2003, downloaded Sep. 3, 2008 [retrieved from http://smartech.gatech.edu/handle/1853/12168], pp. 1-79, 210-271.

International Search Report dated Nov. 19, 2008 for International Application No. PCT/US04/17258.

Cortazar et al., "Monte Carlo Evaluation Model of an Undeveloped Oil Field", *Journal of Energy Finance & Development*, vol. 3, No. 1, pp. 73-84. Available online Jan. 13, 1998. ISSN: 1085-743.

Charnes, John M., "Using Simulation for Option Pricing", The University of Kansas School of Business, Dec. 13, 2000, Presented at 2000 Winter Simulation Conference, Dec. 10-13, 2000, Wyndham Palace Resort and Spa, Orlando, FL, www.wintersim.org, pp. 151-157.

Macmillan, Fional, "Risk, Uncertainty and Investment Decision-Making in the Upstream Oil and Gas Industry", MA Hons (University of Aberdeen), Oct. 2000, A thesis presented for the degree of Ph.D. at the University of Aberdeen.

Longstaff, et al., "Valuing American Options by Simulation: A Simple Least-Squares Approach", Anderson Graduate School of Management, eScholarship Repository, University of California, http://repositories.cdlib.org/anderson/fin/1-01, 2001.

Breeden et al., "Prices of State Contingent Claims Implicit in Options Prices", *Journal of Business*, vol. 51, No. 4, pp. 621-651 (Oct. 1978).

* cited by examiner

SYSTEMS, METHODS AND COMPUTER PROGRAM PRODUCTS FOR PERFORMING A CONTINGENT CLAIM VALUATION

RELATED APPLICATIONS

The present application is a continuation-in-part of U.S. patent application Ser. No. 09/902,021, entitled: SYSTEMS, METHODS AND COMPUTER PROGRAM PRODUCTS FOR PERFORMING A GENERALIZED CONTINGENT CLAIM VALUATION, filed Jul. 10, 2001 now U.S. Pat. No. 6,862,579, the contents of which are hereby incorporated by reference in its entirety

FIELD OF THE INVENTION

The present invention relates generally to contingent claim valuation and, more particularly, to systems, methods and computer program products for evaluating a contingent claim, such as either a call or a put option, having an exercise price that may be either fixed or variable and that may rapidly change or jump over time.

BACKGROUND OF THE INVENTION

It is oftentimes desirable to determine the value of a contingent claim that may be exercised at some time in the future. The two most common forms of a contingent claim are a call and a put, both of which may arise in a wide variety of applications. For example, financial options commonly involve a call in which a stock or other financial instrument may be purchased at some time in the future for a predetermined exercise price or a put in which a stock or other financial instrument may be sold at some time in the future for a predetermined exercise price. While contingent claims frequently occur in the financial arena, contingent claims also arise in a number of other contexts, such as project evaluation and the evaluation of options to purchase or sell other assets, as described below. Unfortunately, the contingent claims that arise in these other contexts may be more difficult to evaluate than the contingent claims that arise in the financial context since the underlying assets in these other contexts are not traded or valued by a well established market, such as the stock market in the financial arena.

By way of example of the contingent claims that occur in contexts other than the financial arena, the contingent claims that arise during project evaluation and options to purchase or sell other assets will be hereinafter described. In this regard, a number of projects are structured so as to include a contingent claim that may be exercised by one of the participants at some time in the future. The contingent claim oftentimes comes in the form of a call in which one of the participants has an option to invest additional amounts of money in order to continue the project. As such, if the initial stages of the project have proved unsuccessful and/or if the future prospects for the project appear bleak, the participant capable of exercising the call will likely decline to invest additional money and thereby forego exercise of the call and will therefore terminate its participation in the project. Alternatively, if the initial stages of the project have been successful and/or if the prospects of success of the project are bright, the participant capable of exercising the call will likely make the necessary investment in order to continue its participation in the project.

Examples of projects that include a contingent claim at some subsequent time are widely varied, but one common example involves a project having a pilot phase extending from some initial time to a subsequent time at which the contingent claim may be exercised. If the contingent claim is exercised, such as by one of the participants contributing the necessary investment to the project, the project will enter a commercial phase. As a more specific example, the project may involve research and development having staged investments in which each investment is essentially a contingent claim with the participant opting to continue with the research and development activity if the participant makes the necessary investment, but withdrawing from the research and development activity if the participant declines to make the investment. By way of other specific examples, the contingent claim may represent an option for the participant to adjust its production level at a subsequent point in time or an option to adjust its production mix in the future.

In addition to project analysis, contingent claims may arise in the context of an option to purchase or sell assets other than financial assets. In such contexts, the contingent claim oftentimes comes in the form of a call or a put in which one of the participants purchases the contingent claim to thereby have an option to purchase an asset or sell an asset at some subsequent time for a predetermined exercise price. The asset in such contexts can comprise any of a number of different assets, both tangible and intangible assets, including goods, services, and licenses such as cruise ship tickets, tickets to the theatre or a sporting event, the rental of a hotel room, and the rental of a car. In a more specific example, then, the contingent claim may comprise an option to purchase an airline ticket with the option being purchased at some initial time, and the option capable of being exercised at a subsequent time to purchase the airline ticket.

In another similar example, the contingent claim may comprise an option to obtain a full refund on an asset purchased at some initial time, with the option being exercisable at a subsequent time to obtain a full refund. In a more specific example, the asset may comprise an airline ticket purchased at some initial time, where the airline ticket is purchased with an option to obtain a refund of the purchase price at a subsequent time at which the option may be exercised. If the option, or contingent claim, is exercised, the purchaser will then be able to obtain a refund of the purchase price of the ticket by selling the ticket back to the airline ticket vendor (e.g., airline).

Regardless of the type of contingent claim, it is desirable to determine the value of a project and, in particular, the contingent claim at the present time. By determining the value of the contingent claim, the participant can avoid overpaying for the project or asset as a result of an over valuation of the contingent claim. Conversely, the participant can identify projects or assets in which the value of the contingent claim has been undervalued and can give strong consideration to investing in these projects or assets since they likely represent worthwhile investment opportunities.

Several techniques have been utilized to determine the value of a project or an asset having a contingent claim at a subsequent time. By way of example, techniques utilized in the context of project evaluation will be hereinafter described. For reasons set forth below, each of these techniques has had difficulty evaluating projects involving real options, that is, contingent claims in assets or activities as opposed to financial assets; in large part since assets and activities are not traded in an organized market in the same manner as financial assets.

One technique that has been utilized is the net present value (NPV) method which generally understates the value of a project by ignoring the option to terminate the project at a subsequent time in order to avoid additional investment in a financially unattractive project. A second technique is a decision tree method which does account for the ability to terminate the project at a subsequent time in order to avoid further investment in a financially unattractive project, but which utilizes an incorrect discount rate. In this regard, the decision tree method does not utilize a discount rate that reflects the underlying risks associated with the contingent claim and, as such, generally overstates the value of the project.

Another technique is the Black-Scholes method, which is widely utilized for option pricing in financial markets. The Black-Scholes method can be expressed algorithmically as follows:

$$C_0 = S_0 N(d_1) - X e^{-rt} N(d_2)$$

wherein $$d_1 = \ln(S_0/X) + (r + \sigma^2/2)T$$

$$d_2 = d_1 - \sigma\sqrt{T}$$

and wherein $C_0 = f(S_0, X, T, r, \sigma)$ in which $S_0$ is the value of the project without the real option, X is the contingent investment, T is the duration of the pilot project, i.e., that period of the project that precedes the contingent investment, r is the continuously compounded, risk-free rate of interest, and $\sigma$ is a volatility parameter.

Of these parameters, $S_0$ and $\sigma$ can be estimated using the following formulae using the mean E and the variance Var of the project value at the end of the pilot project, i.e., at the subsequent time at which the contingent claim is to be exercised, in which the mean E and the variance Var are defined as follows:

$$E(S_T) = S_0 e^{\mu 1}$$

$$\text{Var}(S_T) = S_0^2 e^{2\mu T}(e^{\sigma 2 T} - 1)$$

By utilizing the Black-Scholes method, the value of a project having a contingent claim or call option at a subsequent time can be properly valued so long as the various assumptions upon which the Black-Scholes formula is premised hold true. In this regard, the Black-Scholes model assumes, among other things, that the distribution of contingent future benefits is a lognormal distribution. While a lognormal distribution is reasonable for the evaluation of most financial options, the distribution of contingent future benefits attributable to the exercise of a real option during the course of a project may have other types of distributions such that the valuation of a project according to the Black-Scholes method in these instances may be inaccurate. For example, real options, as well as financial options, can periodically experience large amounts of uncertainty such that the value of contingent future benefits experiences rapid changes, or jumps, at various points over time. Such a rapidly changing value of contingent future benefits is sometimes referred to as the jump-diffusion model of future benefits. With the contingent future benefits experiencing rapid changes, then, the distribution of future benefits is not a lognormal distribution, as is assumed by the Black-Scholes model, but instead is defined by the jump-diffusion model.

Additionally, the Black-Scholes formula presumes that the exercise of a contingent claim involves the investment of a predetermined amount of money at a single time in the future. However, some contingent claims are structured to have two or more points in time in which a participant must separately decide whether to pay additional money in order to exercise respective options. Moreover, some contingent claims are structured such that the exercise price to be paid at some time in the future is not a single predetermined amount of money, but rather is best represented by a distribution of investment levels and respective probabilities.

Furthermore, the Black-Scholes formula presumes that the potential loss at the time of exercising the contingent claim is zero since an investor will not exercise an option which will be financially unattractive. For example, if an investor has an option to purchase a stock at a future exercise time for $10, the Black-Scholes formula presumes that the investor will not exercise the option if, at the future exercise time, the stock is selling for less than $10. In contrast, the exercise of contingent claims in other contexts, such as project valuation, is oftentimes not as simple and may still include a potential loss at the time of exercising the contingent claim.

For each of the foregoing reasons, the Black-Scholes formula may therefore be inapplicable to the evaluation of contingent claims in at least some contexts outside of the financial arena. In this regard, contingent claims involving real options may not be properly evaluated by the Black-Scholes formula since the various assumptions upon which the Black-Scholes formula is premised may not hold true.

Additionally, one feature of the Black-Scholes model that was instrumental in its widespread adoption in the context of the valuation of financial options actually renders the Black-Scholes model somewhat difficult to utilize in the context of the valuation of real options. In this regard, the parameters that are utilized in order to value a financial option by means of the Black-Scholes model are relatively intuitive in the financial context. However, the application of the Black-Scholes model to the valuation of a project having a contingent claim, i.e., a real option, becomes problematic since the parameters that are utilized by the Black-Scholes model do not arise naturally in a traditional project analysis. For example, the volatility parameter required by the Black-Scholes model is not commonly utilized during the project analysis. In order to employ the Black-Scholes method, the parameters that arise naturally in the project context must be translated into the parameters that are utilized by the Black-Scholes method. This translation may become a convoluted exercise, and the process quickly loses its intuitive interpretation. Without this intuitive interpretation, project analysts may place less weight or reliance upon the value of a project determined according to the Black-Scholes model since these project analysts may not have a reasonable understanding of the methodology utilized by the Black-Scholes model. As such, the planning and auditing of the valuation of a project is generally more difficult without this intuitive interpretation.

For purposes of comparison of the traditional techniques for the valuation of a project, consider a project having the following parameters:

Mean of $S_T$=$4,375 million
Std Dev of $S_T$=$1,345 million
T=5 years
r=5.5% continuous
weighted average cost of capital (WACC)=10.5% continuous, and
X=$5,000 million Based upon these parameters, the NPV method would underestimate the project value to be −$370 million, while the decision tree method would overestimate the project value to be $178 million. While the Black-Scholes model correctly determines the project value to be $45 million, the Black-Scholes model is somewhat difficult to utilize since the parameters cannot be directly utilized, but must first be translated as described above, thereby quickly robbing the Black-Scholes model of its intuitive interpretation. As also described above, the Black-Scholes model will generally only provide an accurate valuation of a project so long as the project adheres to all of the assumptions upon which the Black-Scholes model is premised, thereby limiting the applicability of the Black-Scholes model for purposes of contingent claims valuation outside of the financial arena.

SUMMARY OF THE INVENTION

A system, method and computer program project for performing a contingent claim valuation are therefore provided that both correctly determine the proper value of the contingent claim and are capable of intuitive interpretation. In the project analysis context, for example, embodiments of the system, method and computer program product of the present invention utilize parameters that are readily available during a conventional project analysis. Based upon these parameters, embodiments of the system, method and computer program product of the present invention correctly determine the value of the contingent claim by utilizing the proper discount rate and by properly considering the flexibility provided by the contingent claim that may be exercised or declined at a subsequent time. Moreover, to the extent that embodiments of the system, method and computer program product of the present invention do not rely upon the same assumptions as the Black-Scholes formula, the system, method and computer program product provide a more general valuation technique. As such, embodiments of the system, method and computer program product of the present invention provide a significantly improved technique for valuing a contingent claim.

According to one aspect of the present invention, a system, method and computer program product are provided for performing a contingent claim valuation. The system, method and computer program product of this aspect initially determine the present value distribution of contingent future benefits that is attributable to the exercise of a contingent claim at a subsequent time. In this regard, the present value distribution of contingent future benefits is defined as the distribution of contingent future benefits that has been translated to some earlier time, such as the present time. For example, the distribution of future benefits can be translated to some earlier time by being discounted according to a first discount rate, such as a weighted average cost of capital. The present value of an exercise price required to exercise the contingent claim at the subsequent time, such as a contingent future investment (e.g., purchase price) or a contingent future sale price, is also determined. In one advantageous embodiment, the present value of an exercise price comprises a distribution of exercise prices. Like the distribution of future benefits, the distribution of exercise price can be translated to a present value based upon another discount rate, such as a risk-free rate of discounting, that could be different than the first discount rate. Thereafter, the value of the contingent claim is determined based upon the present value distribution of contingent future benefits and the present value of the exercise price. Advantageously, in embodiments utilizing different discount rates, such as the weighted average cost of capital and the risk-free rate of discounting, for translating the distribution of contingent future benefits and the exercise price to the present time, the benefits and price can be effectively valued which, in turn, permits the contingent claim to be properly valued.

In one advantageous embodiment, the system, method and computer program product of the present invention determine the value of the contingent claim by determining an average of the difference between the present value distribution of contingent future benefits and the present value of the exercise price. In determining the average, the system, method and computer program product may limit the difference between the present value distribution of contingent future benefits and the present value of the exercise price to a minimum value of zero in instances in which the present value distribution of contingent future benefits is less than a difference of the present value of the exercise price and the potential loss that remains as a possible outcome at the time at which the contingent claim is to be exercised. In contrast to the Black-Scholes model which is premised upon the potential loss at the time of exercising the contingent claim being zero, the system, method and computer program product of this embodiment provide more flexibility by permitting a contingent claim to be effectively valued even though the potential of a loss may still exist at the time of exercising the contingent claim.

In further contrast to the Black-Scholes model, embodiments of the system, method and computer program product of the present invention are also no longer dependent upon a number of the other assumptions upon which the Black-Scholes model is premised. In this regard, the distribution of contingent future benefits may have a distribution other than lognormal with embodiments of the system, method and computer program product of the present invention still being capable of effectively evaluating the contingent claim. In this regard, the distribution of future benefits can be determined based upon a jump-diffusion model. Additionally, embodiments of the system, method and computer program product of one advantageous embodiment are capable of performing a contingent claim valuation on each of a series of contingent claims, as opposed to the single contingent claim which the Black-Scholes method is capable of evaluating. In this embodiment, the determination of the present value distribution of contingent future benefits, the present value of an exercise price and the value of a contingent claim is repeated in order to value each of the series of contingent claims. Thereafter, the valuation of each contingent claim is refined with the determination of the present value distribution of future benefits of a respective contingent claim being recomputed with the distribution of future benefits being represented by the value previously determined for the immediately succeeding contingent claim. As such, embodiments of the system, method and computer program product of the present invention offer significant flexibility with respect to the contingent claims that may be effectively valued; which flexibility is particularly useful in the valuation of contingent claims involving real options that will be much less likely than financial options to comply with the various assumptions upon which the Black-Scholes model is premised.

In one example, the contingent claim comprises an option to purchase an asset at a subsequent time at which the contingent claim may be exercised. The contingent claim is purchased at an initial time that precedes the exercise of the contingent claim. The asset can comprise any of a number of different assets, both tangible and intangible, both in and out of the financial arena. The asset can include, for example, goods, services, and licenses such as airline tickets, cruise ship tickets, tickets to the theatre or a sporting event, the rental of a hotel room, and the rental of a car. If the contingent claim is exercised, then, the asset is purchased. In this example, the distribution of contingent future benefits consists of the distribution of a value of the asset at the subsequent time contingent upon the exercise of the contingent claim. In embodiments including the first discount rate, the distribution of the value of the asset can be translated to the present time by applying the first discount rate to the distribution of the value of the asset. In addition, the first discount rate that is utilized to translate the distribution of value of the asset to the present time is typically the such as the weighted average cost of capital. As such, the parameters utilized by the system, method and computer program product of the present invention are readily available, and the resulting valuation methodology is therefore intuitive, thereby providing further credibility in the resulting valuation.

Whereas the foregoing embodiments have described, more particularly, valuing contingent claims that comprise calls, according to other aspects of the present invention, systems, methods and computer program products are provided for performing a put valuation. For example, a project may involve a lease of a system, such as an aircraft, that extends from some initial time to a subsequent time at which the contingent claim (sometimes referred to as a "residual value guarantee") may be exercised and the system sold to the lessee for a predetermined price. If the value of the system is below the initially determined price at the conclusion of the lease term, then, the lessor will likely exercise the option and thereby sell the system to the lessee for the predetermined price. In such instances, the system, method and computer program product of embodiments of the present invention provide benefits over the Black-Scholes model in that, whereas many systems include some form of depreciation in value over the time, the Black-Scholes formula ignores such depreciation.

The system, method and computer program of this aspect perform the put valuation by initially determining a present value distribution of contingent future benefits attributable to the exercise of the put at a subsequent time. In this regard, the present value distribution of contingent future benefits can be determined by discounting a distribution of contingent future benefits according to a first discount rate. A present value of an exercise price, or more particularly a contingent future sale price, required to exercise the put at the subsequent time is then determined based upon a second discount rate that need not equal the first discount rate. Finally, the value of the put is determined based upon the present value distribution of contingent future benefits and the present value of the exercise price.

Advantageously, according to various embodiments of the present invention, the contingent claim valuation is capable of being performed with a processing element operating a spreadsheet software program. In such embodiments, the value of the contingent claim, or more particularly the value of the put in various embodiments, can be presented on a display coupled to the processing element. More particularly, the value of the contingent claim (or put) can be presented as a distribution of the value of the contingent claim.

BRIEF DESCRIPTION OF THE DRAWINGS

Figure 1:
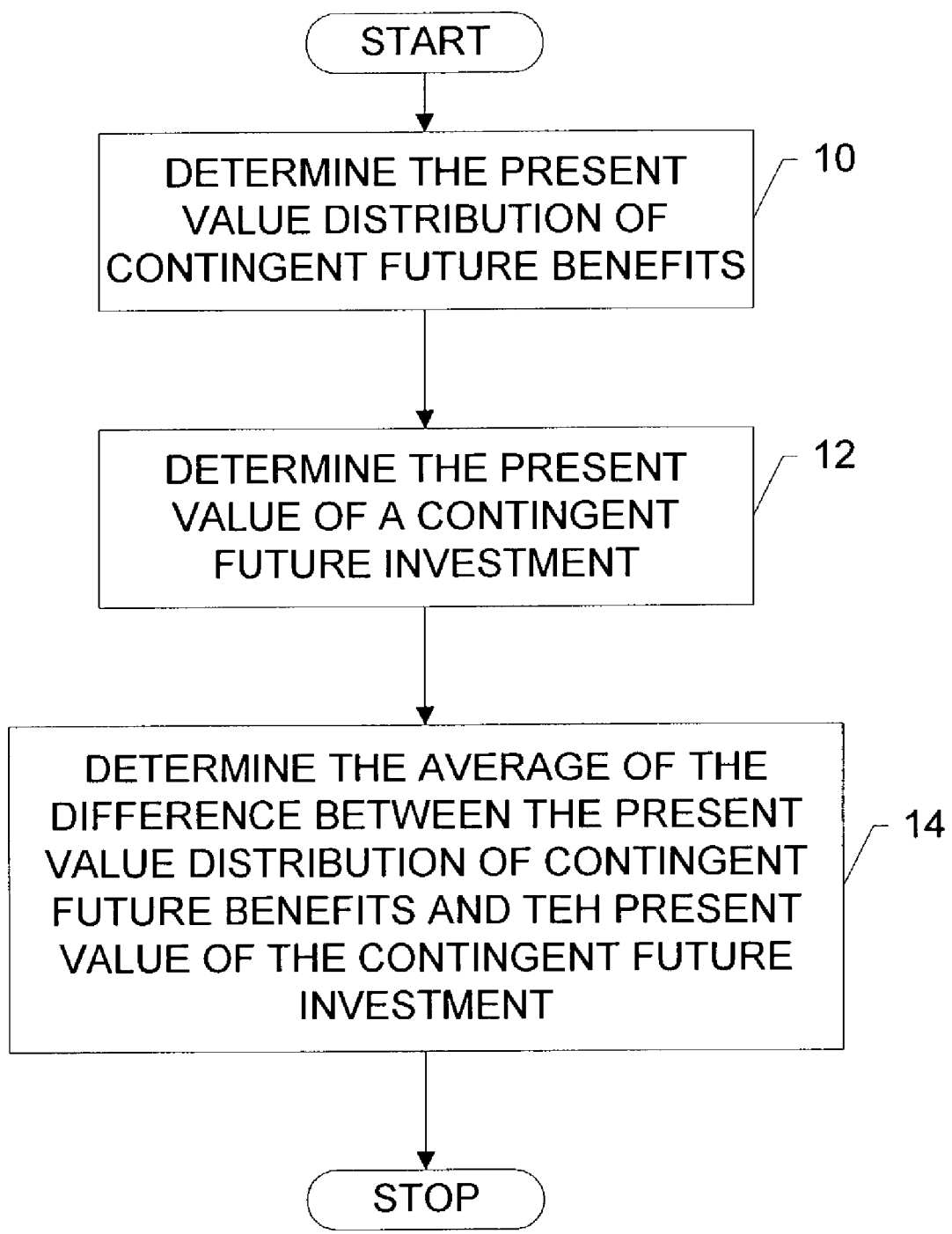
Figure 2:
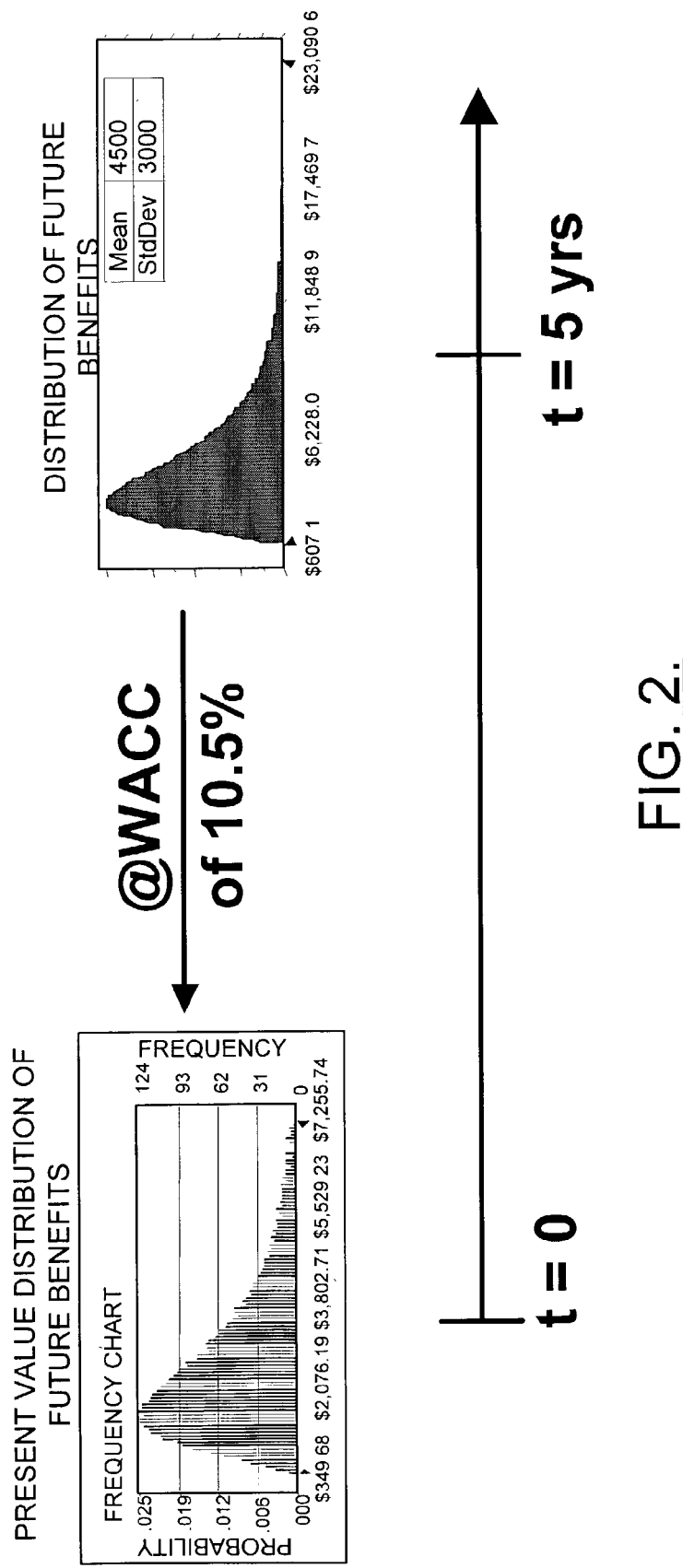
Figure 3:
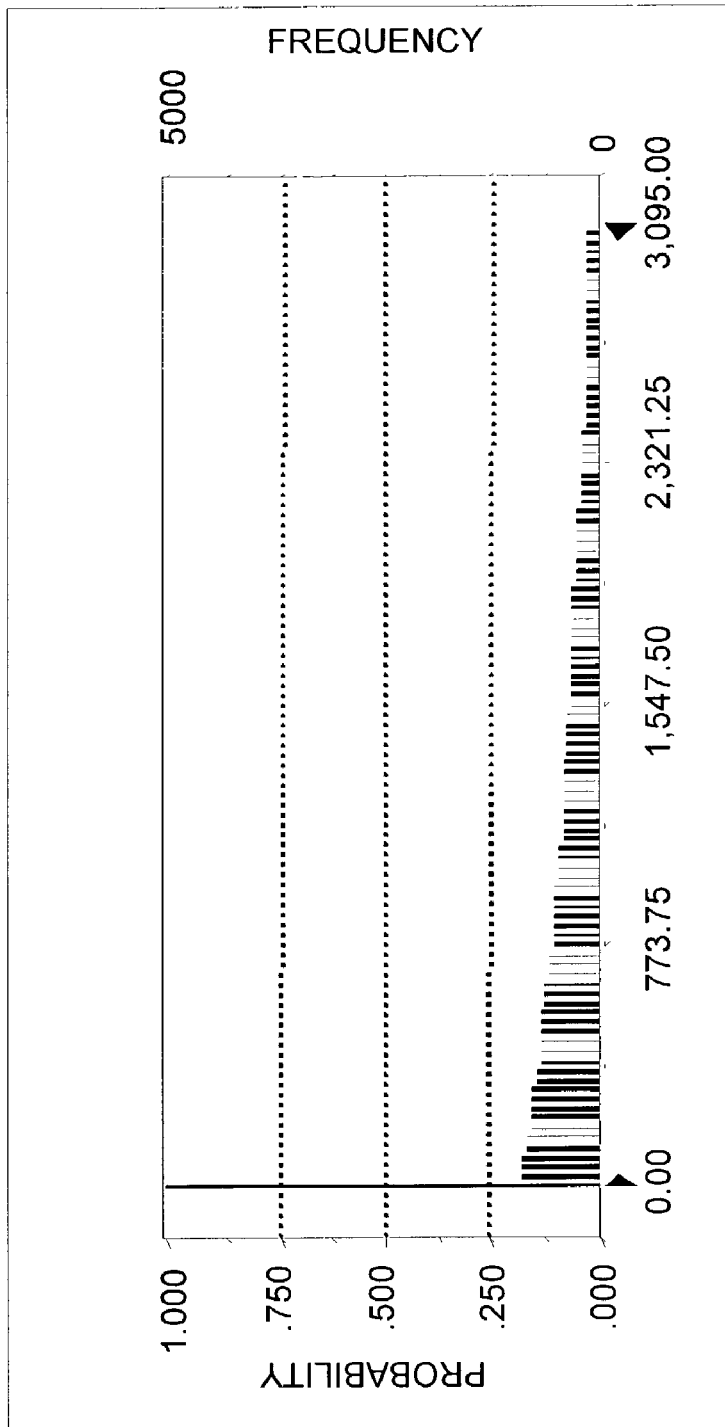
Figure 4:
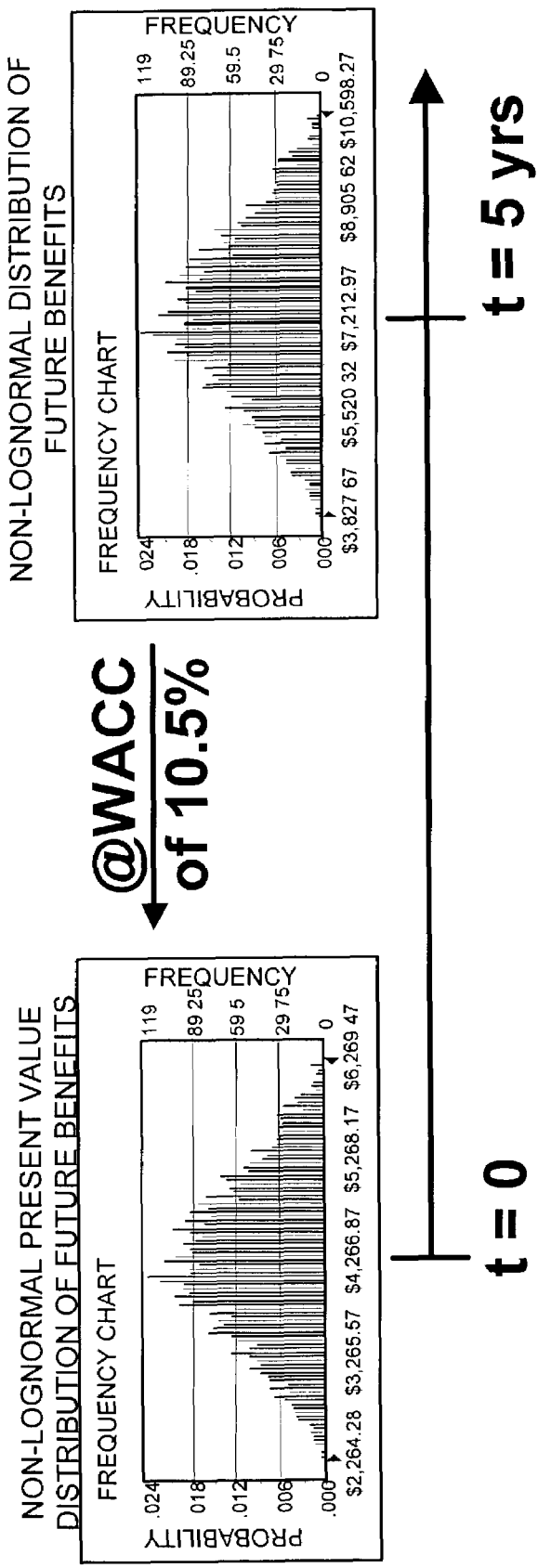
Figure 5:
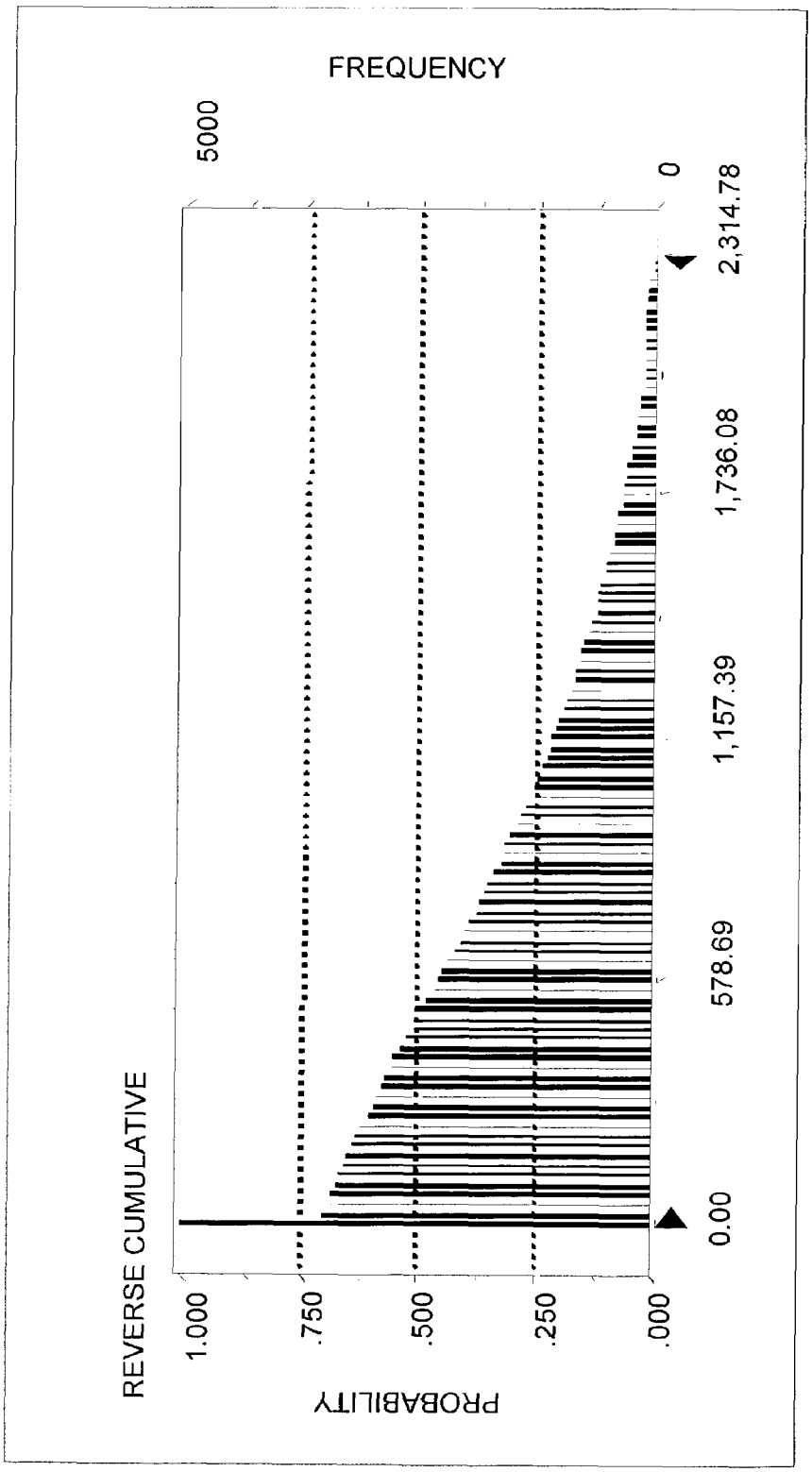
Figure 6:
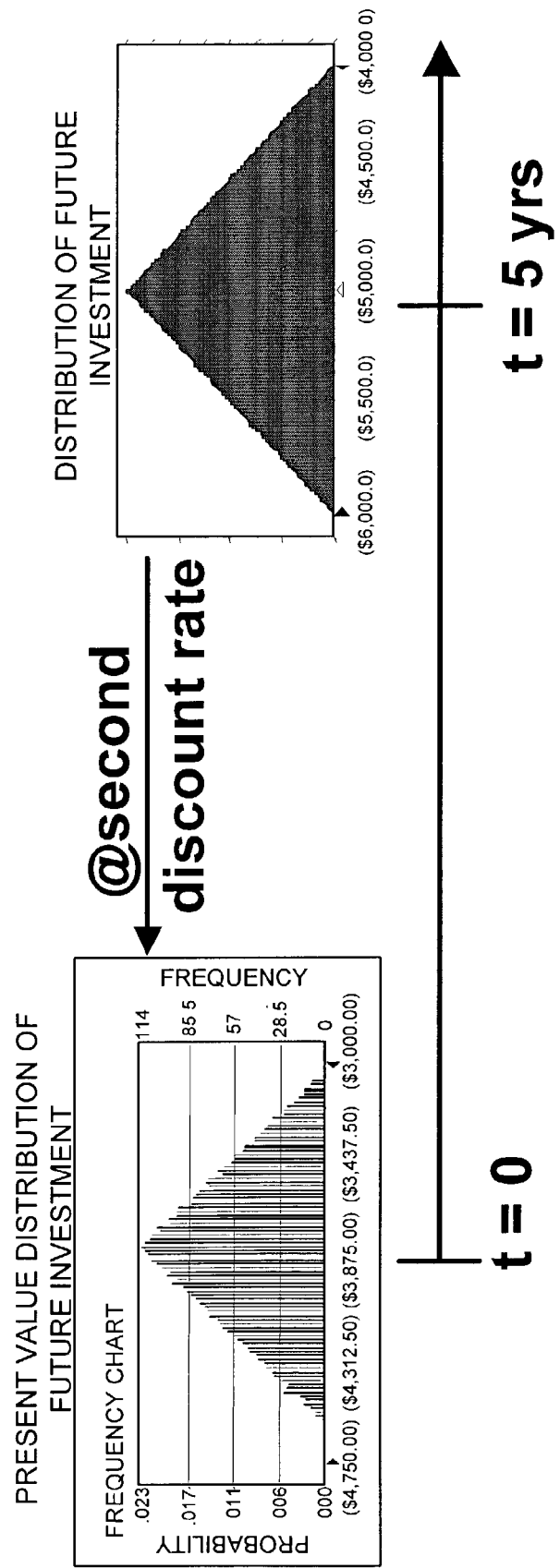
Figure 7:
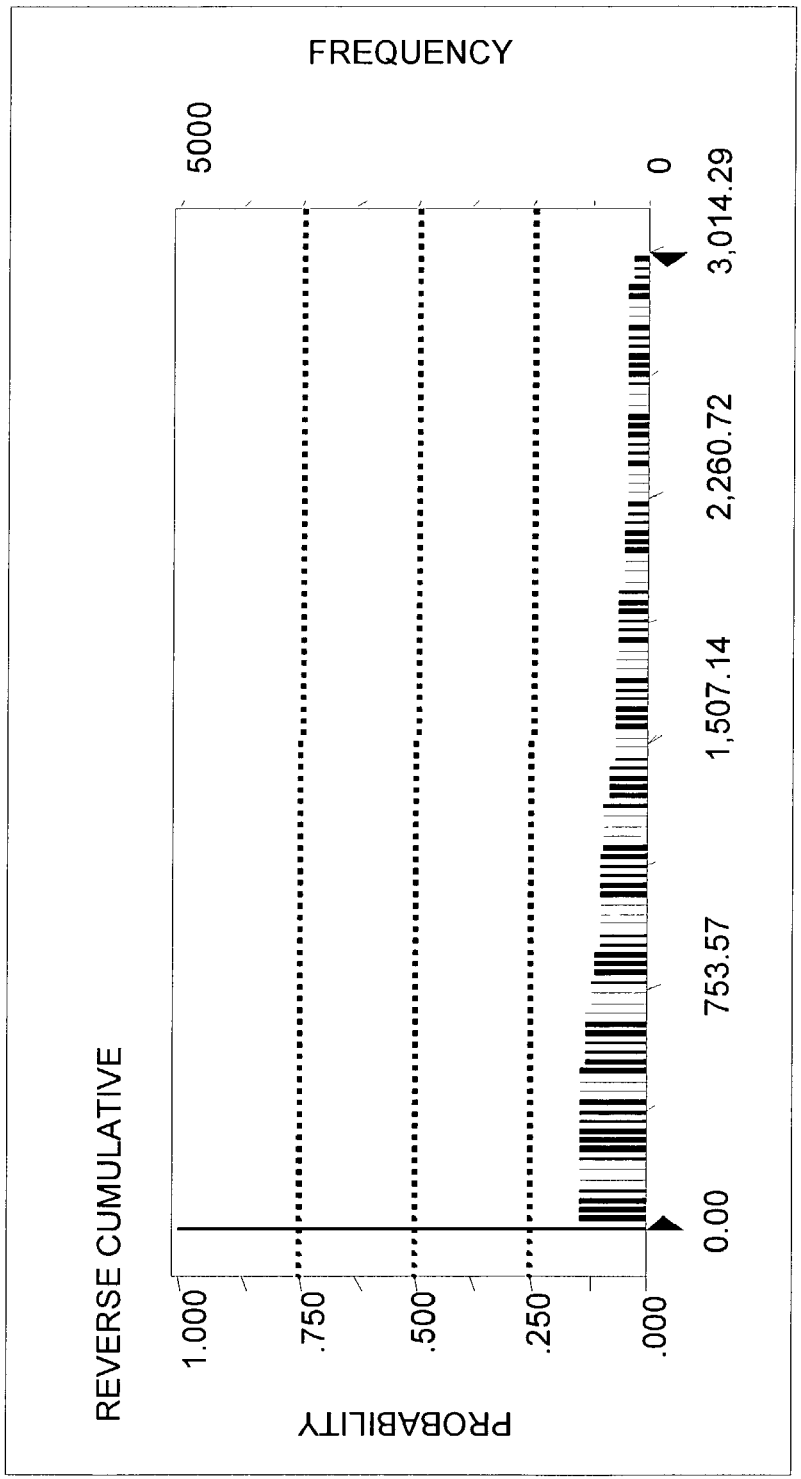
Figure 8:
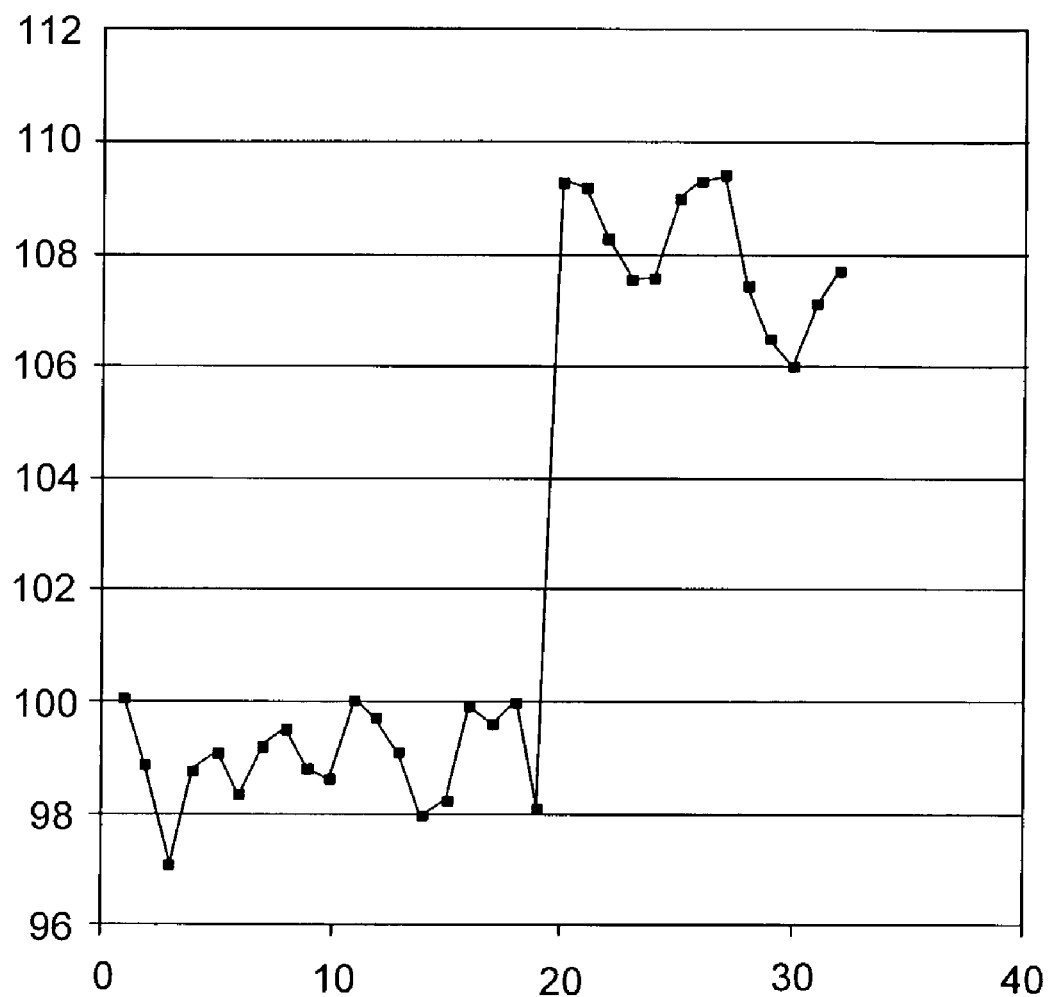
Figure 9:
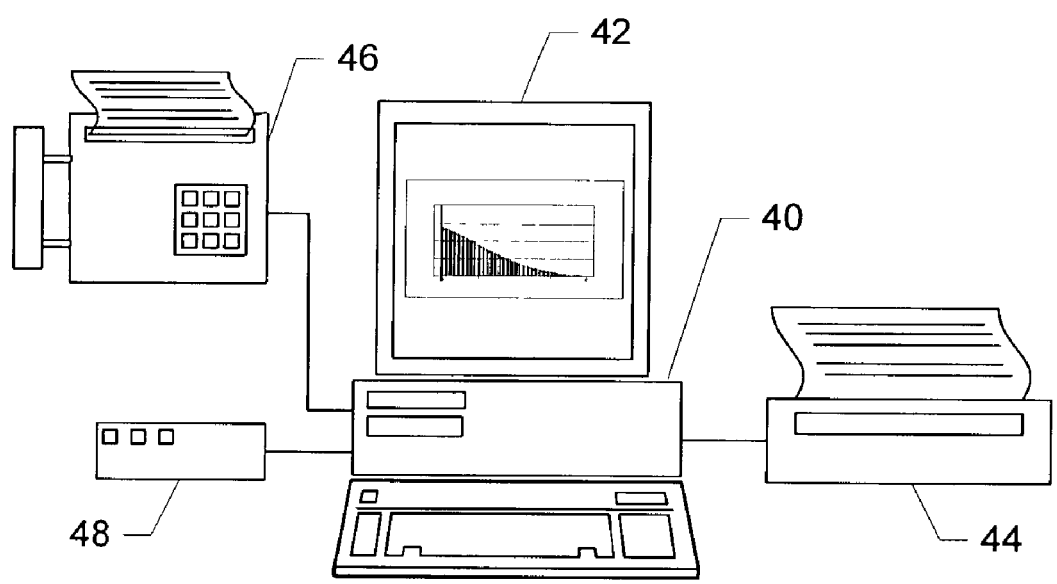

Having thus described the invention in general terms, reference will now be made to the accompanying drawings, which are not necessarily drawn to scale, and wherein:

FIG. 1 is a flow chart illustrating the operations performed by the system, method and computer program product of one embodiment of the present invention;

FIG. 2 is a graphical representation of a distribution of contingent future benefits at a time T, as well as a translation of the distribution of contingent future benefits to the present time according to a system, method and computer program product of one embodiment of the present invention;

FIG. 3 is a graphical representation in reverse cumulative format of the difference between the present value distribution of contingent future benefits depicted in FIG. 2 and the present value of a contingent future investment of $5 billion with the minimum difference being limited to zero;

FIG. 4 is a graphical representation of a non-lognormal distribution of contingent future benefits at a time T, as well as a translation of the distribution of contingent future benefits to the present time according to a system, method and computer program product of one embodiment of the present invention;

FIG. 5 is a graphical representation in reverse cumulative format of the difference between the present value distribution of contingent future benefits depicted in FIG. 4 and the present value of a contingent future investment of $5 billion with the minimum difference being limited to zero;

FIG. 6 is a graphical representation of a distribution of contingent future investments at time T, as well as a translation of the distribution of contingent future benefits to the present time according to a system, method and computer program product of one embodiment of the present invention;

FIG. 7 is a graphical representation in reverse cumulative format of the difference between the present value distribution of contingent future benefits depicted in FIG. 2 and the present value of a contingent future investment of $5 billion with the minimum difference being limited to zero in instances in which the present value distribution of contingent future benefits is less than a difference of the present value of the contingent future investment and a potential loss of $500 million that still exists at the time at which the contingent claim is to be exercised;

FIG. 8 is a graph illustrating future benefits over a period of time, where the future benefits experience one or more rapid changes, or jumps, at various points in time; and FIG. 9 is a schematic block diagram of the system of one embodiment of the present invention embodied by a computer.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

A system, method and computer program product are therefore provided for performing a valuation of a contingent claim, such as a call option or a put option, at a time prior to exercise of the contingent claim. In this regard, the system, method and computer program product will be described in conjunction with the valuation of a contingent claim at the current time, i.e., t=0. However, in determining the present value of a contingent claim, the system, method and computer program product are capable of determining the present value of the contingent claim at any time prior to the exercise of the contingent claim such that subsequent discussion of present value therefore including a valuation at any time prior to the exercise of the contingent claim.

The methodology of the present invention, generically termed the Datar-Mathews (DM)™ algorithm, determines the same value for the project as does the Black-Scholes method in instances in which the various assumptions upon which the Black-Scholes formula is premised are met. However, the methodology of the present invention is more intuitive than the Black-Scholes method, particularly in the project analysis context as a result of its direct utilization of data available from a conventional project analysis. Moreover, the system, method and computer program product of the present invention are not contingent upon as many assumptions as the Black-Scholes model and, as such, is more flexible as to the type of contingent claims that may be effectively evaluated.

The system, method and computer program product may be utilized to perform a valuation of a variety of contingent claims. These contingent claims may be either calls or puts, although calls will be discussed hereinafter by way of example. In addition, the contingent claims may arise in a variety of contexts. For example, the contingent claim may involve the exercise of a real option, that is, an option that may be exercised at some point in time in the future in order to exploit or to continue to exploit an asset or activity, as opposed to a financial asset. In this regard, the real option may arise during a project analysis as discussed in detail below for purposes of example. However, the contingent claim may involve the exercise of other types of options, including financial options. In this regard, the system, method and computer program product of the present invention may provide advantages relative to the Black-Scholes method even in the context of evaluating financial options since the methodology of the present invention is not constrained by the assumptions upon which the Black-Scholes formula is premised.

Even with respect to project analysis, however, the system, method and computer program product are capable of performing a valuation of the contingent claims present in a wide variety of projects. In this regard, the project may have a pilot phase extending from some initial time to a subsequent time at which the contingent claim is to be exercised. If the contingent claim is exercised, such as by one of the participants contributing the necessary investment to the project, the project of this example will enter a commercial phase. As a more specific example, the project may involve research and development having staged investments in which each investment is essentially a contingent claim with the participant opting to continue with the research and development activity if the participant makes the necessary investment, but withdrawing from the research and development activity if the participant declines to make the investment. By way of other specific examples, the contingent claim may represent an option for the participant to adjust its production level at a subsequent point in time or an option to adjust its production mix in the future.

In addition to project analysis, the contingent claim may arise in the context of evaluation of an option to purchase or sell an asset, either in or out of the financial arena. In such contexts, the system, method and computer program product are capable of performing a valuation of the contingent claims for the purchase of a wide variety of assets. In this regard, the contingent claim may comprise an option to purchase an asset at a subsequent time at which the option is to be exercised, where the contingent claim is purchased at an initial time prior to the exercising the option. In a more specific example, then, the contingent claim may comprise an option to purchase an airline ticket with the option being purchased at some initial time, and the option capable of being exercised at some subsequent time to purchase of the airline ticket.

In another similar example, the contingent claim may comprise an option to obtain a full refund on an asset purchased at some initial time, with the option being exercisable at a subsequent time to obtain a full refund. In a more specific example, the asset may comprise an airline ticket purchased at some initial time, where the airline ticket is purchased with the option to obtain a refund of the purchase price at a subsequent time at which the option may be exercised. If such an option, or contingent claim, is exercised, the purchaser will then be able to obtain a refund of the purchase price of the ticket by selling the ticket back to the airline ticket vendor (e.g., the airline).

By way of other specific examples, the contingent claim may represent an option for the participant to purchase any of a number of different assets, particularly in instances in which the value of the asset (i.e., price consumers are willing to pay for the asset) can vary over time or between purchases, such as in the case of the purchase of cruise ship tickets, the purchase of tickets to the theatre or a sporting event, the rental of a hotel room, and the rental of a car. While various examples have been provided, it should be understood that the system, method and computer program product may be utilized to evaluate a number of other contingent claims, in the project analysis context, in the context of evaluation of an option to purchase or sell an asset (both in and out of the financial arena), and in other contexts, if so desired.

According to the present invention, the present value of future benefits is initially determined as shown generically in block 10 of FIG. 1. The future benefits are typically expressed as a distribution of future benefits that would flow from the underlying asset. As shown in FIG. 2, the distribution of future benefits generally assigns a probability to each respective value of the future benefits. For example, the distribution of future benefits may represent a distribution of the net operating profit associated with a project following the exercise of a contingent claim at the subsequent time, $t=T$. Alternatively, for example, the distribution of future benefits may represent a distribution of the value associated with an asset following the exercise of a contingent claim at the subsequent time, $t=T$, where the value is determined based upon a price consumers are willing to pay for the asset. In the example in which the contingent claim is an option to purchase a ticket, the distribution of future benefits is the distribution of ticket prices that consumers would be willing to pay at the time of exercising the option. However, the distribution of future benefits may represent a wide variety of other types of future benefits depending upon the context.

The distribution of future benefits may be developed in any manner known to those skilled in the art. In the context of a project, for example, project analysts or cost engineers may develop the distribution of future benefits based upon market studies, cost analyses and a myriad of other factors as known to those skilled in the art.

In order to determine the present value of the future benefits, such as at $t=0$, the distribution of future benefits is discounted by a first discount rate. The first discount rate is preferably selected to take into account the risk associated with the distribution of future benefits as known to those skilled in the art. In some embodiments, however, the weighted average cost of capital (WACC) is utilized as the first discount rate. For the example depicted in FIG. 2, the distribution of net operating profit at time $t=T$ is discounted by a WACC of 10.5% to create the present value distribution of net operating profit at time $t=0$. While the first discount rate is preferably selected to be appropriate for the particular situation, the WACC is commonly utilized since it provides an average discount rate with which most analysts are familiar. In this regard, project analysts generally utilize the WACC in project evaluations employing the net present value method. By translating the distribution of future benefits to the present time by means of a discount rate, the WACC, which is readily available and with which most analysts are familiar, the intuitive interpretation or transparency of the system, method and computer program product of the present invention is therefore enhanced.

With respect to the example depicted in FIG. 2, it is noted that dollar values (in billions of dollars) associated with the distribution of future benefits and the present value distribution of future benefits are provided. It should be understood, however, that the specific dollar values are merely for purposes of illustration and scale and are not intended to limiting in any fashion as to the type of distributions of future benefits that may be analyzed.

Moreover, the distribution of future benefits depicted in FIG. 2 and described above is a single distribution of future benefits at time t=T. In some situations, the distribution of future benefits may actually be a series of future benefits, each of which may have a different distribution, that occur at various times, such as annually, following the exercise of the contingent claim. In these situations, the system, method and computer program product of the present invention preferably determine the cumulative present value distribution of the entire series of future benefits. This determination may be made in several manners including translating each future benefit to the time at which the contingent claim is to be exercised, i.e., t=T, and then summing the contributions of each future benefit following translation to create a single distribution of future benefits at time t=T; which single distribution of future benefits is then translated to the present time in the manner described above. Alternatively, each future benefit may be separately translated to the present time and then summed to determine the present value distribution of future benefits. In either situation, each future benefit may be discounted at either the same discount rate as or a different discount rate from other future benefits, depending upon the risk associated with the respective future benefit.

In addition to determining the present value of future benefits, the present value of the exercise price, which in the context of a call option comprises a contingent future investment, is determined as shown in block 12 of FIG. 1. In this regard, the contingent future investment is typically the cost or purchase price of the contingent claim or call at the subsequent time t=T. In order to determine the present value of the contingent future investment, the contingent future investment is discounted by an appropriate discount rate that may be different than the first discount rate at which the distribution of contingent future benefits is discounted. The discount rate is preferably selected to take into account the risk associated with the contingent claim as described above and known to those skilled in the art. In some embodiments, the risk free rate of discounting is utilized. In other embodiments, however, the contingent future investment is subject to a non-market or corporate risk such that the appropriate discount rate is the corporate bond rate.

Thereafter, the value of one contingent claim, such as the value of the project in the foregoing example, is determined based upon the present value distribution of contingent future benefits and the present value of the contingent future investment. Typically, the value of the contingent claim is determined by determining the average difference between the present value distribution of contingent future benefits and the present value of the contingent future investment taking into account the relative probabilities associated with distribution of difference values. See block 14 of FIG. 1. By way of example, in the context of the project depicted in FIG. 2, the contingent future investment at time t=5 years is $5 billion which is discounted to the current time t=0 at a risk free rate of discounting of 5.5% to a present value of $3.79786 billion. The average difference between the present value distribution of the contingent future benefits and this present value of the contingent future investment is then determined. In determining the average difference between the present value distribution of the contingent future benefits and the present value of the contingent future investment, a limit on the minimum permissible difference may be established to take into account those situations that may exist at the time at which the contingent claim is to be exercised which would cause a participant to fail to exercise the contingent claim. In this regard, limiting the minimum permissible difference to zero takes into account those situations in which the exercise of the contingent claim would otherwise create a loss since a reasonably prudent participant will fail to exercise the contingent claim in these situations.

By way of example, FIG. 3 depicts the difference in reverse cumulative format between the present value distribution of contingent future benefits shown in FIG. 2 and the present value of the corresponding contingent future investment of $3.79786 billion subject to the constraint that the minimum permissible difference is zero. All nonpermissible differences are set to zero. As will be apparent, a reverse cumulative distribution depicts the number, proportion or percentage of values greater than or equal to a given value. With reference to FIG. 3, for example, there is a probability of 1.0 that the difference between the present value distribution of contingent future benefits and the present value of the contingent future investment will be 0 or greater, while there is a probability of about 0.12 that the difference between the present value distribution of contingent future benefits and the present value of the contingent future investment will be $773.75 million or greater. It is also noted from the exemplary distribution depicted in FIG. 3, that a sizeable percentage, such as about 80% or so, of the difference values have been set to zero, thereby indicative of situations existing at the time at which the contingent claim is to be exercised which would cause a participant to fail to exercise the contingent claim, such as those situations in which the exercise of the contingent claim would otherwise create a loss as described above.

Based on the distribution of difference values depicted in FIG. 3, the average difference may then be determined by taking into account the relative probabilities associated with the distribution of difference values. This average difference between the present value distribution of contingent future benefits and the present value of the contingent future investment is the present value of the contingent claim such as the project in this instance. Such an average difference also equals the value that would be determined according to the Black-Scholes method in instances in which the assumptions on which the Black-Scholes method are premised are satisfied. In this regard, although not wishing to be bound by theory, see U.S. patent application Ser. No. 09/902,021, for a description of the equivalence of the methodology of the present invention with the Black-Scholes method, as applied to call options and in instances in which the assumptions upon which the Black-Scholes formula are met may be proved mathematically.

Advantageously, the parameters utilized by the system, method and computer program product of the present invention are readily available, such as in the context of most conventional project analysis techniques. One such parameter is the distribution of future benefits, such as the distribution of net operating profits, that would flow from the underlying assets. Other parameters are the discount rate, such as the WACC, utilized to translate the distribution of the contingent future benefits to the present time, the contingent future investment and the discount rate, such as the risk free rate of discounting, utilized to translate the contingent future investment to the present time. The system, method and computer program product of the present invention are quite intuitive or transparent to analysts, thereby increasing the likelihood that the methodology employed by the present invention will be accepted by the industry and adding to the credibility of the resulting contingent claim valuations. As a result of the intuitive interpretation of the methodology of the present invention, the planning and auditing of the contingent claim valuations determined by the system, method and computer program product of the present invention should also be facilitated.

Additionally, the validity of the valuations determined by the system, method and computer program product of the present invention are not dependent upon the assumptions that underlie the Black-Scholes model. In particular, the system, method and computer program product can effectively value distributions of future benefits that are not lognormal, as otherwise required by the Black-Scholes model. For example, as described below, the distribution of future benefits can be determined according to a jump-diffusion model. As such, the system, method and computer program product are quite flexible; a characteristic that is particularly useful in the valuation of contingent claims, such as projects having real options, that are more likely to produce non-lognormal distributions of future benefits than financial options.

By way of example, FIG. 4 (as well as FIG. 8 described below) depicts a distribution of contingent future benefits that is not lognormal. As shown graphically in FIG. 4, the non-lognormal distribution of future benefits is translated to the present time by discounting the distribution and future benefits by the WACC. According to the system, method and computer program product of the present invention, the value of the contingent claim is determined based upon the present value non-lognormal distribution of future benefits and the present value of the contingent future investment as described above. In this regard, the difference between the present value non-lognormal distribution of contingent future benefits and the present value of the contingent future investment is depicted in reverse cumulative format in FIG. 5. Based upon the distribution of difference values depicted in FIG. 5, the average difference may then be determined by taking into account the relative probabilities associated with distribution of difference values in order to determine the present value of the contingent claim. As such, the system, method and computer program product of the present invention can determine the present value of contingent claims having a wide variety of distributions of contingent future benefits that are not limited to an analysis of distributions of contingent future benefits that are lognormal as is the Black-Scholes model.

As described above in the foregoing examples and as required by the Black-Scholes model, the contingent future investment, or exercise price, has been described to be a single payment that has a predetermined value. In some applications, however, the contingent future investment may not have a single value, but may be best represented by a distribution of contingent future investments which relate probabilities to each of a plurality of different contingent future investments. In this regard, FIG. 6 depicts a distribution of contingent future investments and the probabilities that the respective contingent future investments will be paid at the time of exercising the contingent claim. Obviously, at the time at which the contingent claim is to be exercised, the participant will only be required to make a single investment. However, in analyzing the contingent future investment at the present time, the contingent future investment has a range of potential values, each having an associated probability.

In order to determine the value of the contingent claim in instances in which the contingent future investment (i.e., exercise price) is best represented by a distribution, the distribution of contingent future benefits is translated to the present time by means of an appropriate discount rate, such as a risk-free rate of discounting, the corporate bond rate or the like. The difference between the present value distribution of contingent future benefits and the present value distribution of the contingent future investments is then determined. In this regard, the difference between a respective future benefit value and each of a plurality of future investment values from the distribution of contingent future investments is determined for each of a plurality of future benefit values. The average of the differences is then determined. As before, the minimum difference may again be limited, such as to zero, in the manner described above. The average of the differences between the distribution of contingent future benefits and the distribution of contingent future investments is the value of the contingent claim. As such, the system, method and computer program product of the present invention are capable of determining the value of a contingent claim even in instances in which the contingent future investment is best represented by distribution, thereby further increasing the flexibility of the methodology of the present invention.

A system, method and computer program product of one embodiment of the present invention is also capable of determining the value of a contingent claim in instances in which a potential loss at the time of exercising a contingent claim is not zero, but is some other value. Unlike the exercise of financial options in which the potential loss at the time of exercising the financial option is zero since it is presumed that an investor will not exercise a financial option in instances in which the exercise of the financial option will cause a loss, such as by purchasing stock through the exercise of the financial option for a higher price than the stock is currently traded over the counter, in some applications, such as the valuation of projects, the project may still have a potential loss at a time of exercising the contingent claim.

In one example depicted in FIG. 7, the participant is required to exercise a contingent claim by investing $5 billion with a potential loss of $500 million being possible before the participant could terminate the project. In order to effectively value the contingent claim in this situation, both the distribution of contingent future benefits and the contingent future investment are translated to the present time by means of discounting by the appropriate discount rate(s). Thereafter, a difference, not just between the present value distribution of contingent future benefits and the contingent future investments, but between the present value distribution of contingent future benefits and the difference of the present value of the contingent future investment and the potential loss at the time of exercising the contingent claim is determined. In instances in which difference would be negative, the difference is set to zero. Thereafter, the average difference is determined to be the value of the contingent claim in this situation, thereby effectively valuing a contingent claim even in instances of imperfect pruning so as to further increase the flexibility of the system, method and computer program product of the present invention. See, for example, FIG. 7 in which the distribution of difference values is depicted for the foregoing example in reverse cumulative format.

In further contrast to the Black-Scholes model which can accommodate a single contingent claim, the system, method and computer program product of one advantageous embodiment of the present invention are capable of valuing a series of contingent claims which occur at different points in time in the future. In this situation, a participant will make an election two or more times during the course of a project or the like by making further investments in the project or by terminating its further participation. In order to effectively evaluate the series of contingent claims, the system, method and computer program product of this embodiment initially performs a separate contingent claim valuation for each contingent claim. Thereafter, the valuation of each contingent claim is refined by again determining the valuation for each contingent claim, albeit with the value of the immediately succeeding contingent claim serving as the distribution of contingent future benefits for during the valuation of the prior contingent claim. By effectively valuing a series of contingent claims, the flexibility of the system, method and computer program product of the present invention is further enhanced.

As stated in the background section, the Black-Scholes model assumes, among other things, that the distribution of contingent future benefits is a lognormal distribution. In contrast, the system, method and computer program product of another advantageous embodiment of the present invention are capable of valuing a contingent claim, where the value of the contingent future benefits is capable of experiencing rapid changes, or jumps, at various points over time, as shown in FIG. 8. For example, over the course of time, the value of a number of different assets, such as oil and fuel, traditionally experience one or more rapid changes or jumps. In such instances, the distribution of contingent future benefits can be defined according to a jump-diffusion model.

The distribution of future benefits can be defined according to the jump-diffusion model in any one of a number of different manners. In one embodiment, for example, the distribution of future benefits is defined by first setting a number of different parameters, including a value of the project from inception of the project $P_0$ (or at any point designated as t=0), the volatility $\sigma$ of the value of the project, and the time until exercise of the contingent future investment at t=T. Also, a number of instances I in time between t=0 and t=T at which the value of the project can change can be defined, where each instance an be represented as i such that i=0, 1, 2, . . . I. In addition, a discount rate $\mu$ is selected, such as to take into account the risk associated with the future benefits as known to those skilled in the art (e.g., WACC).

Thus, the contingent future benefits $P_i$ at each instance i in time between t=0 and t=T can be determined according to the jump-diffusion model of contingent future benefits as $P_{i+1}=P_i+dP_i$, where $dP_i$ can be determined as follows:

$$dP_i = P_i \times \left( \mu \times \frac{T}{I} + \sigma \times \varepsilon \sqrt{\frac{T}{I}} + (e^\Psi - 1) \times B \right)$$

In the foregoing equation, $\epsilon$ represents a distribution of the diffusion of the contingent future benefits, B represents a distribution of the likelihood of the occurrence of a jump, or rapid change, in the value of the contingent future benefit, and $\psi$ represents a distribution of the magnitude of the jump or rapid change. The distributions can be defined in any of a number of different manners. In one embodiment, for example, $\epsilon$ is defined as a standard normal distribution (i.e., having a mean of zero and a standard deviation of one), B is defined as a binomial distribution defined by a probability of returning a value of one equal to the probability of a jump occurring at any given instance (i.e., a jump rate divided by T). Also, in such an embodiment, $\psi$ is defined as a normal distribution defined by a mean of zero and a standard deviation of the magnitude of the jump.

By determining the contingent future benefits at each instance based upon a number of distributions (i.e., $\epsilon$, B and $\psi$), a value of the contingent future benefit at the time of exercising the contingent future investment at t=T can be determined by selecting a value for each distribution and solving the aforementioned equation for $P_T$. Advantageously, the value for each distribution can be selected according to a method for randomly selecting the value of the contingent future benefit, such as the Monte Carlo method. As known to those skilled in the art, the Monte Carlo method is a method of randomly generating values for uncertain variables to simulate a model.

After determining the value of the contingent future benefit at time t=T, the method of selecting a value for each distribution (i.e., $\epsilon$, B and $\psi$) and solving for $P_T$ can continue for a number of iterations to thereby acquire an array of values of contingent future benefits at t=T. From the array of values of contingent future benefits $P_T$, then, the distribution of contingent future benefits can be defined, such as by determining a mean and a standard deviation of the values of contingent future benefits $P_T$. The distribution of contingent future benefits, now defined according to the jump-diffusion model, can then be utilized as previously described to determine the present value of the contingent claim.

Although the system, method and computer program product of embodiments of the present invention have been described in conjunction with the valuation of a contingent claim comprising a call option, embodiments of the system, method and computer program product can equally be described in conjunction with the valuation of a contingent claim comprising a put option. For example, the project may involve a lease of a system, such as an aircraft, that extends from some initial time to a subsequent time at which the contingent claim (sometimes referred to as a "residual value guarantee") may be exercised and the system sold to the lessee for a predetermined price. If the value of the system exceeds the initially determined price at the conclusion of the lease term, the lessor will likely forego exercising the option, not sell the system and thereby regain possession of the system from the lessee. In contrast, if the value of the system is below the initially determined price at the conclusion of the lease term, the lessor will likely exercise the option and thereby sell the system to the lessee for the predetermined price. In such instances, the system, method and computer program product of embodiments of the present invention provide benefits over the Black-Scholes model in that, whereas many systems include some form of depreciation in value over the time, the Black-Scholes formula ignores such depreciation.

In instances in which the contingent claim comprises a put option, the present value of future benefits can be initially determined, as before. The distribution of future benefits may represent a wide variety of types of future benefits depending upon the context. In one embodiment, for example, the distribution of future benefits represents a distribution of the value of a system at a subsequent time t=T at which a contingent claim may be exercised. The distribution of future benefits may be developed in any manner known to those skilled in the art.

From the distribution of future benefits, then, the present value of the future benefits can be determined, such as at t=0. Whereas the present value of the future benefits can be determined in any one of a number of manners, in one embodiment, the present value of the future benefits is determined by discounting the distribution of future benefits by a first discount rate (e.g., WACC), such as described above. The first discount rate is preferably selected to take into account the risk associated with the distribution of future benefits as known to those skilled in the art.

In addition to determining the present value of future benefits, the present value of the contingent future sale price is determined, in a manner similar to the present value of the contingent future investment in the context of a call option, as described above. In this regard, the contingent future sale price is typically the cost of the contingent claim or put at the subsequent time t=T. Just as before with respect to the distribution of future benefits, in order to determine the present value of the contingent future sale price, the contingent future sale price can be discounted by an appropriate discount rate (e.g., risk free rate of discounting) that may be different than the first discount rate at which the distribution of contingent future benefits is discounted.

Thereafter, the value of the contingent claim is determined based upon the present value distribution of contingent future benefits and the present value of the contingent future sale price. In this regard, the value of the contingent claim can be determined in a manner similar to that described above in the context of a call option. It should be noted that, just as in the case of a call option, a limit on the minimum permissible difference may be established to take into account those situations that may exist at the time at which the put option is to be exercised which would cause a participant to fail to exercise the put option. In this regard, limiting the minimum permissible difference to zero takes into account those situations in which the exercise of the put option would otherwise create a loss since a reasonably prudent participant will fail to exercise the put option in these situations.

For each of the reasons described above, the system, method and computer program product of the various embodiments of the present invention are not limited to the evaluation of contingent claims that meet all of the assumptions upon which the Black-Scholes model is premised. Therefore, the system, method and computer program product of the present invention are much more flexible than the Black-Scholes model. Thus, while the system, method and computer program product of the present invention can effectively evaluate contingent claims in the financial arena, the system, method and computer program product of the present invention are particularly well suited to the evaluation of projects or other situations involving real options since these situations oftentimes do not meet each of the assumptions upon which the Black-Scholes model is premised and can therefore not properly be evaluated by the Black-Scholes model. Moreover, even if a contingent claim could be properly evaluated by the Black-Scholes model, the system, method and computer program product of the present invention utilize parameters that are much more commonly available to project analysts and the like and are therefore more intuitive and transparent to the project analysts, thereby increasing the credibility of the valuation provided by the system, method and computer program product of the present invention.

As shown in FIG. 9, the system of the present invention is typically embodied by a processing element and an associated memory device, both of which are commonly comprised by a computer 40 or the like. In this regard, as indicated above, the method of embodiments of the present invention can be performed by the processing element manipulating data stored by the memory device with any one of a number of commercially available computer software programs. In one embodiment, the method can be performed with data that is capable of being manipulated and/or presented in spreadsheet form. For example, the method can be performed by the processing element manipulating data stored by the memory device with Excel, a spreadsheet software program distributed by the Microsoft Corporation of Redmond, Wash., including Crystal Ball, a Monte Carlo simulation software program distributed by Decisioneering, Inc. of Denver, Colo.

The computer can include a display 42 for presenting information relative to performing embodiments of the method of the present invention, including the various distributions, models and/or conclusions as determined according to embodiments of the present invention. To plot information relative to performing embodiments of the method of the present invention, the computer can further include a printer 44.

Also, the computer 40 can include a means for locally or remotely transferring the information relative to performing embodiments of the method of the present invention. For example, the computer can include a facsimile machine 46 for transmitting information to other facsimile machines, computers or the like. Additionally, or alternatively, the computer can include a modem 48 to transfer information to other computers or the like. Further, the computer can include an interface (not shown) to a network, such as a local area network (LAN), and/or a wide area network (WAN). For example, the computer can include an Ethernet Personal Computer Memory Card International Association (PCM-CIA) card configured to transmit and receive information to and from a LAN, WAN or the like.

According to one aspect of the present invention, the system of the present invention generally operates under control of a computer program product according to another aspect of the present invention. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 1 is a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. By way of but one example, the contingent claims valued by the system, method and computer program product of the present invention may be American style calls, as opposed to the European style calls referenced in the above-described examples. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for performing a put valuation comprising:
   determining a present value distribution of contingent future benefits attributable to the exercise of the put at a subsequent time, wherein determining the present value distribution of contingent future benefits comprises discounting a distribution of contingent future benefits according to a first discount rate;
   determining a present value of a contingent future sale price required to exercise the put at the subsequent time based upon a second discount rate; and
   determining a value of the put based upon the present value distribution of contingent future benefits and the present value of the contingent future sale price,
   wherein determining a present value distribution of contingent future benefits, determining a present value of a contingent future sale price, and determining a value of the put are performed by a processor configured to perform determining a present value distribution of contingent future benefits, determining a present value of a contingent future sale price, and determining a value of the put.

2. A method according to claim 1 wherein determining the value of the put comprises determining an average of the difference between the present value distribution of contingent future benefits and the present value of the contingent future sale price.

3. A method according to claim 1 wherein determining the present value distribution of contingent future benefits comprises determining the present value distribution of contingent future benefits of a distribution of contingent future benefits that has a non-lognormal distribution.

4. A method according to claim 1 wherein determining the present value of the contingent future sale price comprises determining the present value distribution of contingent future sale prices of a distribution of contingent future sale prices required to exercise the put at the subsequent time.

5. A method according to claim 1 wherein determining the present value of a contingent future sale price required to exercise the put at the subsequent time comprises discounting the contingent future sale price by a risk free rate of discounting.

6. A method according to claim 1 wherein determining the present value distribution of contingent future benefits comprises discounting the distribution of contingent future benefits by a weighted average cost of capitol.

7. A method according to claim 1 further comprising:
   repeating the determination of the present value distribution of contingent future benefits, the present value of a contingent future sale price and the value of a put in order to value each of a series of puts; and
   refining the valuation of each put with the determination of the present value distribution of future benefits of a respective put comprising determining the present value of the value previously determined for an immediately succeeding put.

8. A method according to claim 1 wherein performing the put valuation comprises performing the put valuation with a processing element operating a spreadsheet software program, and wherein the method further comprises presenting a display of the value of the put on a display coupled to the processing element.

9. A method according to claim 8 wherein presenting the display comprises presenting a display of the value of the put comprising a distribution of the value of the put.

10. A method according to claim 1, wherein determining a present value of a contingent future sale price comprises determining a present value of a contingent future sale price based upon a second discount rate that is unequal to the first discount rate.

11. An apparatus for performing a put valuation comprising:
    a processor configured to determine a present value distribution of contingent future benefits attributable to the exercise of the put at a subsequent time, including being configured to discount a distribution of contingent future benefits according to a first discount rate,
    wherein the processor is also configured to determine a present value of a contingent future sale price required to exercise the put at the subsequent time based upon a second discount rate, and
    wherein the processor is further configured to determine a value of the put based upon the present value distribution of contingent future benefits and the present value of the contingent future sale price.

12. An apparatus according to claim 11 wherein the processor being configured to determine the value of the put includes being configured to determine an average of the difference between the present value distribution of contingent future benefits and the present value of the contingent future sale price.

13. An apparatus according to claim 11 wherein the processor being configured to determine the present value distribution of contingent future benefits includes being configured to determine a present value distribution of contingent future benefits of a distribution of contingent future benefits having a non-lognormal distribution.

14. An apparatus according to claim 11 wherein the processor being configured to determine the present value distribution of contingent future sale prices includes being configured to determine a present value distribution of contingent future sale prices of a distribution of contingent future sale prices required to exercise the put at the subsequent time.

15. An apparatus according to claim 11 wherein the processor being configured to determine the present value of a contingent future sale price required to exercise the put at the subsequent time includes being configured to discount the contingent future sale price by a risk free rate of discounting.

16. An apparatus according to claim 11 wherein the processor being configured to determine the present value distribution of contingent future benefits includes being configured to discount the distribution of contingent future benefits by a weighted average cost of capitol.

17. An apparatus according to claim 11 wherein the processor is configured to repeat the determination of the present value distribution of contingent future benefits, the present value of a contingent future sale price and the value of a put in order to value each of a series of puts, and wherein the processor is configured to refine the valuation of each put with the determination of the present value distribution of future benefits of a respective put being determined based upon the present value of the value previously determined for an immediately succeeding put.

18. An apparatus according to claim 11 wherein processor is configured to operate a spreadsheet software program to thereby perform the put valuation, the apparatus further comprising:
a display coupled to the processor, wherein the display is configured to present the value of the put.

19. An apparatus according to claim 18 wherein the display is configured to present the value of the put as a distribution of the value of the put.

20. An apparatus according to claim 11, wherein the processor being configured to determine a present value of a contingent future sale price includes being configured to determine a present value of a contingent future sale price based upon a second discount rate that is unequal to the first discount rate.

21. A computer program product for performing a put valuation, the computer program product comprising a computer-readable storage medium having computer-readable program code portions stored therein, the computer-readable program code portions comprising:
a first executable portion for determining a present value distribution of contingent future benefits attributable to the exercise of the put at a subsequent time, wherein said first executable portion is adapted to determine the present value by discounting a distribution of contingent future benefits according to a first discount rate;
a second executable portion for determining a present value of a contingent future sale price required to exercise the put at the subsequent time based upon a second discount rate; and
a third executable portion for determining a value of the put based upon the present value distribution of contingent future benefits and the present value of the contingent future sale price.

22. A computer program product according to claim 21 wherein said third executable portion is adapted to determine the value of the put by determining an average of the difference between the present value distribution of contingent future benefits and the present value of the contingent future sale price.

23. A computer program product according to claim 21 wherein said first executable portion is adapted to determine the present value distribution of contingent future benefits of a distribution of contingent future benefits that has a non-lognormal distribution.

24. A computer program product according to claim 21 wherein said second executable portion is adapted to determine the present value distribution of contingent future sale prices of a distribution of contingent future sale prices required to exercise the put at the subsequent time.

25. A computer program product according to claim 21 wherein said second executable portion is adapted to determine the present value of a contingent future sale price required to exercise the put at the subsequent time by discounting the contingent future sale price by a risk free rate of discounting.

26. A computer program product according to claim 21 wherein said first executable portion is adapted to determine the present value distribution of contingent future benefits by discounting the distribution of contingent future benefits by a weighted average cost of capitol.

27. A computer program product according to claim 21 wherein said first, second and third executable portions repeat the determination of the present value distribution of contingent future benefits, the present value of a contingent future sale price and the value of a put in order to value each of a series of puts, and wherein the computer program product is adapted to refine the valuation of each put with said first executable portion adapted to determine the present value distribution of future benefits of a respective put based upon the present value of the value previously determined for an immediately succeeding put.

28. A computer program product according to claim 21 further comprising a fourth executable portion capable of generating a display of the value of the put.

29. A computer program product according to claim 28 wherein the fourth executable portion generates a display of the value of the put comprising a distribution of the value of the put.

30. A computer program product according to claim 21 wherein the second executable portion is adapted to determine a present value of a contingent future sale price based upon a second discount rate that is unequal to the first discount rate.

* * * * *